(12) United States Patent
Yepes Gallo et al.

(10) Patent No.: US 11,325,289 B2
(45) Date of Patent: May 10, 2022

(54) METHOD OF FORMING A SCREW BOSS IN AN INJECTION MOLDED POLYMER PART

(71) Applicant: Ford Global Technologies, LLC, Dearborn, MI (US)

(72) Inventors: Santiago Yepes Gallo, Mexico City (MX); Ryan Mowery, Albion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 134 days.

(21) Appl. No.: 16/654,116

(22) Filed: Oct. 16, 2019

(65) Prior Publication Data
US 2021/0114268 A1    Apr. 22, 2021

(51) Int. Cl.
| | | |
|---|---|---|
| *B29C 45/14* | (2006.01) | |
| *B29C 45/16* | (2006.01) | |
| *B29K 55/02* | (2006.01) | |
| *B29K 23/00* | (2006.01) | |

(52) U.S. Cl.
CPC .. *B29C 45/14311* (2013.01); *B29C 45/14065* (2013.01); *B29C 45/14336* (2013.01); *B29C 45/1615* (2013.01); *B29C 45/1657* (2013.01); *B29C 2045/14122* (2013.01); *B29K 2023/12* (2013.01); *B29K 2055/02* (2013.01)

(58) Field of Classification Search
None
See application file for complete search history.

(56) References Cited

U.S. PATENT DOCUMENTS

| | | | | | |
|---|---|---|---|---|---|
| 2,480,966 | A | * | 9/1949 | Richardson | B22D 19/00 164/237 |
| 3,010,229 | A | * | 11/1961 | Saulsnitzer | A43C 15/165 36/127 |
| 3,112,540 | A | * | 12/1963 | Kazuo | B22D 19/00 164/111 |
| 3,129,444 | A | * | 4/1964 | Kahn | F16B 37/122 470/10 |
| 3,187,073 | A | * | 6/1965 | Bingham, Jr. | B29D 35/128 264/255 |
| 3,530,921 | A | * | 9/1970 | Ernest | F16B 37/122 411/259 |
| 3,735,507 | A | * | 5/1973 | Granger | A43C 15/161 36/59 R |
| 3,738,026 | A | * | 6/1973 | Granger | A43B 5/001 36/59 R |

(Continued)

FOREIGN PATENT DOCUMENTS

| | | |
|---|---|---|
| DE | 202014103640 U1 | 8/2014 |
| DE | 102016215414 A1 | 2/2018 |
| KR | 101857489 B1 | 5/2018 |

*Primary Examiner* — Edmund H Lee
(74) *Attorney, Agent, or Firm* — Vichit Chea; Price Heneveld LLP

(57) ABSTRACT

A method of forming a molded polymer part having a screw boss includes positioning a screw boss insert on a pin of a mold tool. The screw boss insert may contact guide surfaces of the mold tool. During molding, polymer material flows along the screw boss insert while the screw boss insert is positioned on the pin. The polymer material may bond to the screw boss insert. The screw boss insert may include one or more geometric features that prevent rotation and/or axial movement of the screw boss insert relative to the surrounding polymer material.

20 Claims, 8 Drawing Sheets

(56) References Cited

U.S. PATENT DOCUMENTS

| | | | |
|---|---|---|---|
| 3,876,176 A * | 4/1975 | Morin | A43B 5/001 249/96 |
| 4,470,784 A | 9/1984 | Piotrovsky | |
| 4,780,259 A * | 10/1988 | Buttry | F02P 7/021 264/249 |
| 4,842,462 A * | 6/1989 | Tildesley | F16B 37/122 249/59 |
| 4,984,320 A * | 1/1991 | Curley, Jr | A43B 13/12 12/142 P |
| 5,243,775 A * | 9/1993 | Swain | A43C 15/161 36/134 |
| 5,386,651 A * | 2/1995 | Okamoto | A43B 13/26 36/134 |
| 5,391,031 A * | 2/1995 | Medal | B29C 65/08 411/180 |
| 5,879,115 A * | 3/1999 | Medal | B29C 66/30321 411/82 |
| 6,193,456 B1 * | 2/2001 | Stumpf | F16B 37/122 411/180 |
| 6,540,462 B1 * | 4/2003 | Bretschneider | F16B 37/005 411/82 |
| 7,070,725 B2 * | 7/2006 | Mathew | B29C 45/14795 264/254 |
| 7,624,893 B2 | 12/2009 | Hoff et al. | |
| 8,185,167 B2 | 5/2012 | Kim et al. | |
| 8,742,255 B2 | 6/2014 | Pavlovic et al. | |
| 9,446,488 B2 | 9/2016 | Coronado | |
| 10,006,481 B2 * | 6/2018 | Tomatsu | F16B 37/005 |
| 10,441,997 B2 * | 10/2019 | Stumpf | B22C 9/101 |

* cited by examiner

METHOD OF FORMING A SCREW BOSS IN AN INJECTION MOLDED POLYMER PART

FIELD OF THE INVENTION

The present invention generally relates to screws bosses in molded components, and in particular to a screw boss insert that can be positioned prior to molding.

BACKGROUND OF THE INVENTION

Molded polymer components may have screw bosses for threaded fasteners. Molded screw bosses may cause defects such as "sink". Sink is an injection defect (e.g., a low spot) that may be caused by differences in cooling rates between the main geometry and the attaching features. Various approaches such as surround material modifications and "dog houses" have been utilized in an effort to deal with issues relating to screw bosses in injection molded polymer components.

SUMMARY OF THE INVENTION

One aspect of the present disclosure is a method of forming a screw boss in an injection molded polymer part. The method includes providing a polymer screw boss insert defining an axis and having first and second opposite ends. The polymer screw boss insert has an outer surface extending between the first and second opposite ends, and a pin cavity having an opening at the first end. A mold tool having first and second mold tool parts is provided. The mold tool parts form a cavity when the first and second mold tool parts are in a closed position relative to one another. At least one of the first and second mold tool parts has a boss cavity portion and a pin projecting into the boss cavity portion. The boss cavity portion defines inner guide surfaces and at least one channel between the guide surfaces. The method further includes positioning the screw boss insert at least partially within the boss cavity portion with the pin received in the pin cavity of the screw boss insert with at least a first portion of the outer surface of the screw boss insert in contact with the inner guide surfaces, and with at least a second portion of the outer surface spaced apart from the surface of the boss cavity portion at the channels to form side passageways extending along the at least one channel. The method further includes causing molten polymer material to flow into the cavity and into the side passageways along the outer surface of the screw boss insert while the screw boss insert is positioned on the pin. The molten polymer material is allowed to solidify whereby the polymer in the side passageways bonds to the screw boss insert and retains the screw boss insert to solidify polymer material in the primary cavity.

Embodiments of the first aspect of the disclosure can include any one or a combination of the following features:
- The screw boss insert may optionally include a cylindrical outer surface portion.
- The inner guide surfaces are optionally cylindrical.
- The method optionally includes causing the cylindrical outer surface of the screw boss insert to contact the cylindrical inner guide surfaces.
- The outer surface of the screw boss insert optionally includes a first outer surface portion adjacent the first end, a second outer surface portion adjacent the second end, and a transition surface between the first and second outer surface portions.
- The screw boss insert optionally includes at least one non-circular surface feature.
- The method optionally includes causing molten polymer material to flow into engagement with the non-circular surface feature whereby the polymer material prevents rotation of the screw boss insert when the polymer material solidifies.
- The first outer surface optionally includes an annular groove and cylindrical rib surfaces on opposite sides of the annular groove.
- The boss cavity portion optionally includes a cylindrical surface that contacts the cylindrical rib surfaces and is spaced apart from the surface of the annular groove to form an annular passageway that connects to the side passageways.
- The method optionally includes causing molten polymer material to flow through the side passageways into the annular passageways.
- The annular groove optionally includes at least two annular grooves with a first cylindrical rib surface between the at least two annular grooves and second and third cylindrical rib surfaces adjacent the at least two annular grooves opposite the first cylindrical rib surface.
- The at least two annular grooves are optionally connected to the side passageways.
- The method optionally includes causing molten polymer material to flow through the side passageways into the at least two annular grooves.
- The second end of the screw boss insert optionally comprises a cylindrical outer surface portion that has a smaller diameter than a diameter of the cylindrical rib surfaces.
- The cylindrical outer surface portion is optionally spaced apart from a surface of the secondary cavity to form an annular gap when the screw boss insert is positioned in the boss cavity portion on the pin.
- The method optionally includes causing molten polymer material to flow into the annular gap around the second end of the screw boss insert.
- The second end optionally includes a second end surface, and the pin cavity optionally does not extend to the second end surface.
- The method optionally includes causing molten polymer material to cover the second end surface.
- The side passageways optionally extend across the cylindrical rib surfaces to form gaps.
- The method optionally includes causing molten polymer material to flow into the side passageways over the cylindrical rib surfaces to form reinforcing ribs upon solidification of the polymer material.
- The second outer surface portion optionally includes an outer surface spaced inwardly from the front outer surface portion.
- The transition surface optionally extends transversely between the first outer surface portion and the second outer surface portion.
- The boss cavity portion optionally includes an annular mold surface extending around and engaging the first outer surface portion adjacent the transition surface to prevent flow of molten polymer material between the annular mold surface and the first outer surface portion of the screw boss insert.
- The secondary cavity optionally includes a mold surface portion that is spaced apart from the second outer surface portion to form a gap therebetween.

The method optionally includes causing molten polymer material to flow into the gap around the second outer surface portion.

The non-circular surface feature optionally comprises at least one channel formed in the second outer surface portion, wherein the at least one channel has a base surface that is non-circular.

The non-circular surface feature optionally comprises at least a pair of substantially planar surfaces on opposite sides of the second outer surface portion.

The pin cavity optionally has a substantially cylindrical inner surface.

After the molten polymer material has solidified, a self-tapping threaded screw is optionally engaged with the inner surface to form threads in the inner surface and to interconnect the injection molded polymer part and a second part.

A robot is optionally utilized to position the screw boss insert on the pin in the boss cavity portion.

According to another aspect of the present disclosure, a screw boss insert includes a polymer body having first and second opposite ends and a first outer surface portion adjacent the first end, a second outer surface portion adjacent the second end, and a transition surface between the first and second outer surface portions. The first outer surface portion has a transverse dimension that is greater than a transverse dimension of the second outer surface portion, the transition surface extends between the first and second outer surface portions and faces the second opposite end. The first and second opposite ends have first and second end surfaces, respectively. The second outer surface portion includes a non-circular surface feature. The body further includes a blind pin cavity having an opening in the first surface. The blind pin cavity has a generally cylindrical inner surface configured to receive a self-tapping threaded screw to form threads in the inner surface.

Embodiments of the second aspect of the disclosure can include any one or a combination of the following features:

The screw boss insert optionally comprises a one-piece continuous molded polymer part.

The inner surface optionally comprises molded polymer.

The first outer surface portion optionally includes at least one outwardly-opening annular groove and first and second cylindrical rib surfaces on opposite sides of the annular groove.

The non-circular surface feature optionally comprises at least one channel having a substantially planar base surface.

The first and second outer surface portions optionally include first and second cylindrical outer surfaces.

The transition surface optionally comprises an annular step that is orthogonal to the first and second cylindrical outer surfaces.

Another aspect of the present disclosure is a method of forming a screw boss in an injection molded polymer component. The method includes forming a polymer insert by injection molding thermoplastic polymer material into a first mold cavity. The polymer insert includes a plurality of grooves on an outer surface, and a screw-receiving opening. The polymer insert is positioned on a pin in a second mold cavity by inserting the pin into the screw-receiving opening. The method further includes causing molten thermoplastic polymer material to flow around the polymer insert and into the plurality of grooves on the outer surface of the polymer insert. The thermoplastic polymer material is allowed to solidify around the polymer insert.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
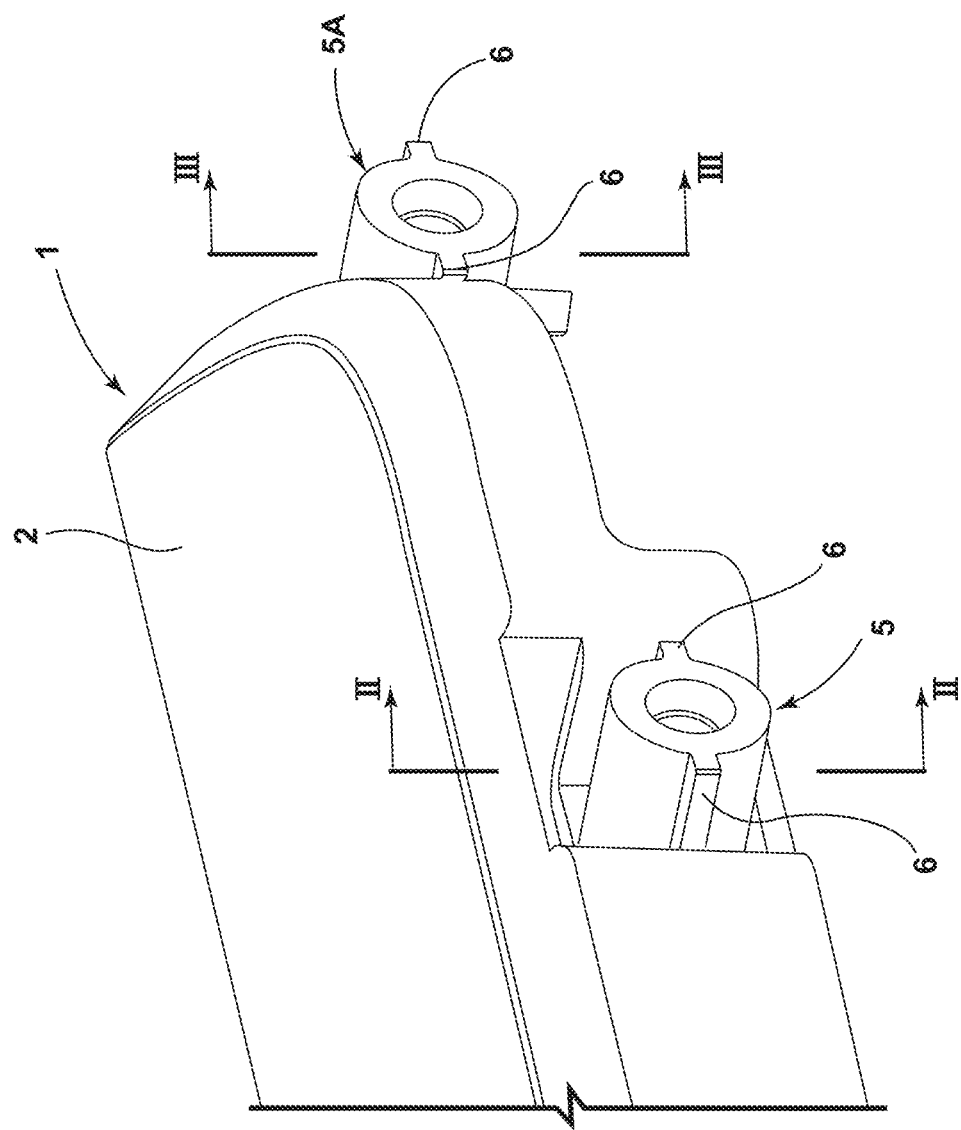
FIG. 1 is a partially fragmentary perspective view of a component including screw bosses according to one aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
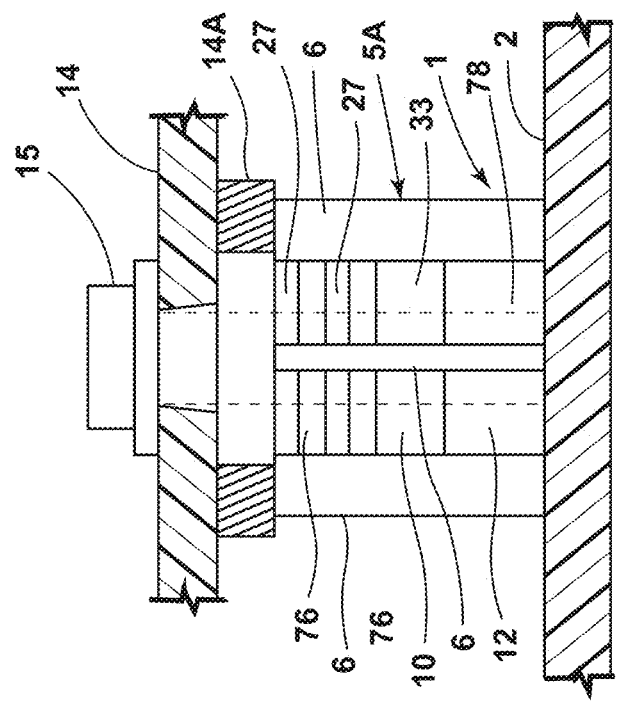
FIG. 3 is a cross-sectional view of the component of FIG. 1 taken along the line III-III.
Figure 2:
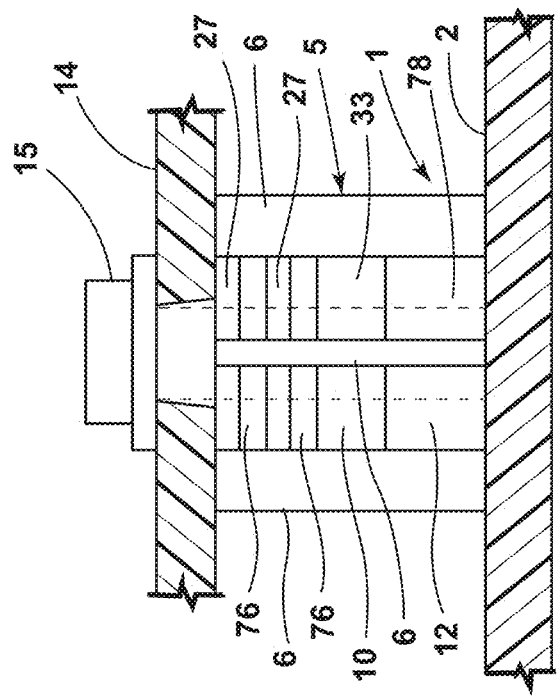
FIG. 2 is a cross-sectional view of the component of FIG. 1 taken along the line II-II.

With reference to FIG. 1, a component 1 may comprise injection molded polymer (e.g., polypropylene, ABS, or other suitable thermoplastic or thermosetting polymer) having a body 2 and screw bosses 5 and 5A. Screw bosses 5 and/or 5A may optionally include reinforcing ribs 6. With reference to FIG. 2, screw boss 5 includes a screw boss insert 10 (see also FIG. 5) that is molded into a screw boss column 12 of component 1. A screw 15 threadably engages the screw boss insert 10 to retain a second component 14 to the screw boss 5 of component 1. As shown in FIG. 3, screw boss 5A is similar to screw boss 5, except the screw boss 5A is configured to support first and second components 14 and 14A, respectively, via a screw 15 that threadably engages a screw boss insert 10 of screw boss 5A.

Figure 4:
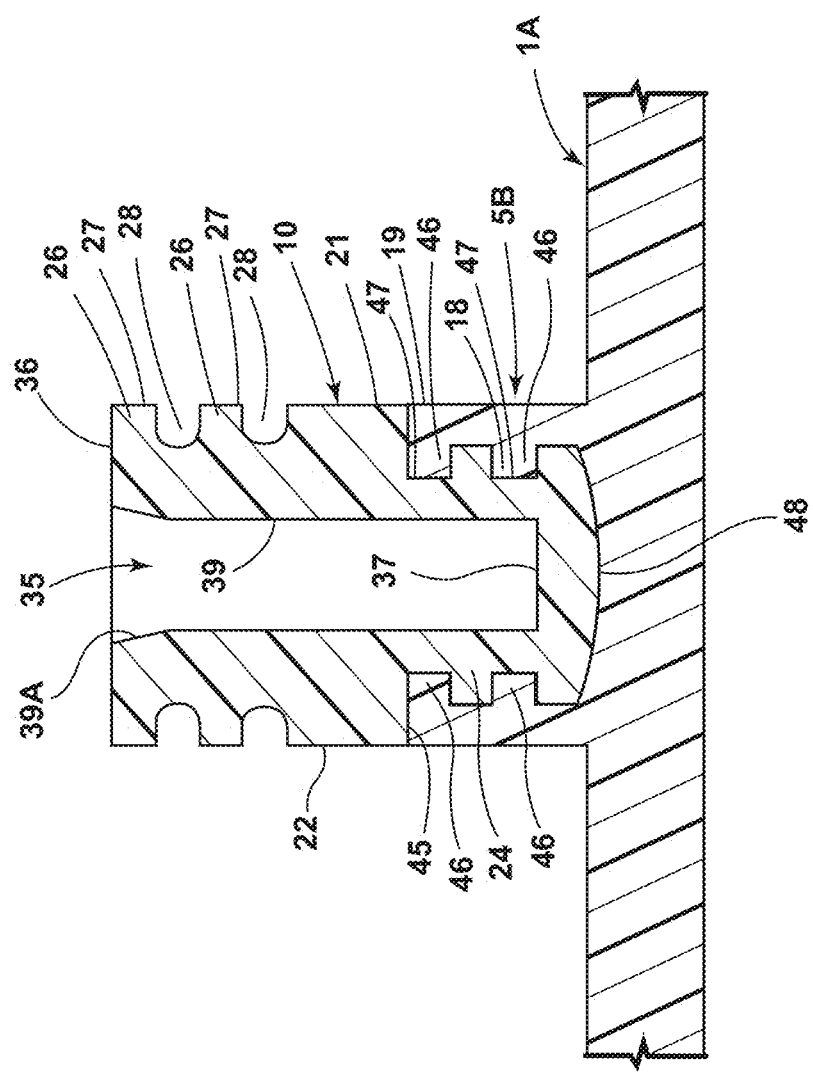
FIG. 4 is a cross-sectional view of a screw boss insert according to another aspect of the present disclosure.
Figure 5:
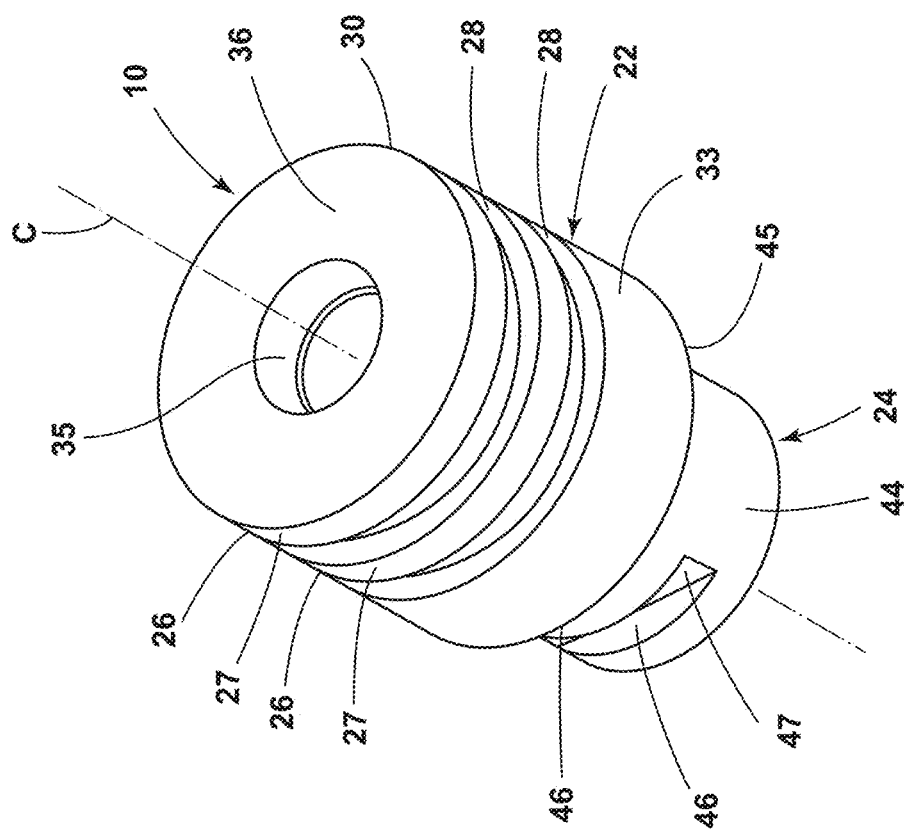
FIG. 5 is an isometric view of a screw boss insert.

With further reference to FIG. 4, screw boss insert 10 may also be utilized in a screw boss 5B that does not include ribs 6. Screw boss insert 10 includes upper (first) end portion 22 and lower (second) end portion 24 (FIG. 5). When screw boss insert 10 is utilized in a screw boss 5B, molded polymer material 18 surrounding end portion 24 of screw boss insert 10 has an outer surface 19 that may be substantially flush with outer surface 21 of screw boss insert 10. Outer surface 19 is optionally cylindrical.

Figure 6:
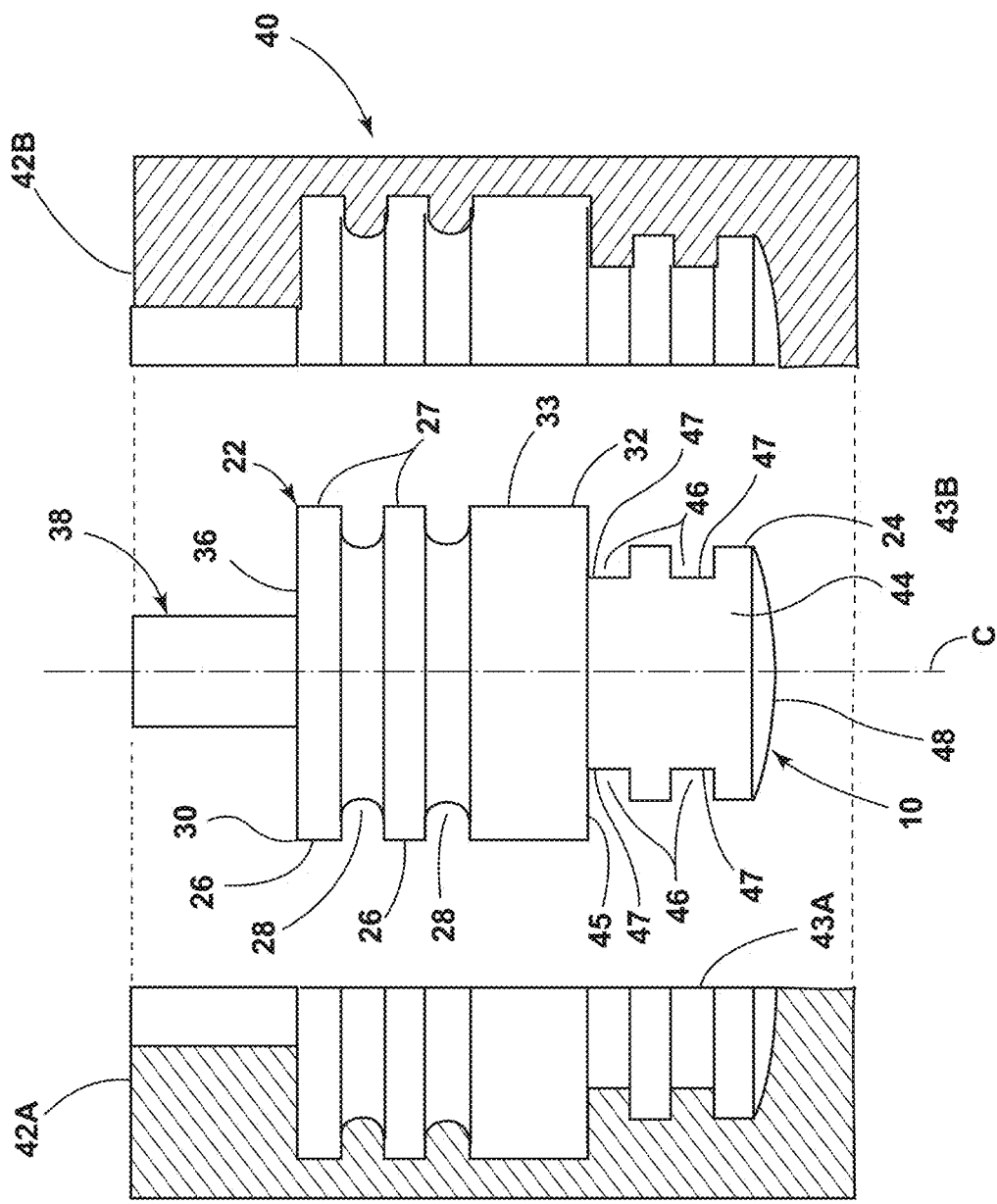
FIG. 6 is a partially schematic view showing molding of the screw boss insert of FIG. 5.

With further reference to FIGS. 5 and 6, screw boss insert 10 comprises molded polymer material having upper portion 22 and a lower portion 24. The lower portion 24 has a reduced transverse dimension (e.g., diameter) relative to upper portion 22. Upper portion 22 includes ribs 26 and grooves 28 formed between ribs 26. The ribs 26 and grooves 28 may be annular and extend around periphery 30 of upper portion 22 of screw boss insert 10. Ribs 26 include outer surfaces 27. Outer surfaces 27 may be cylindrical. A shoulder 32 of upper portion 22 has a cylindrical outer surface 33 that may be the same transverse dimension (e.g., diameter) as cylindrical outer surface 27 of ribs 26. The upper portion 22 of screw boss insert 10 may be generally symmetrical about a center line "C" of screw boss insert 10.

Screw boss insert 10 may be formed by injection molding utilizing a mold tool 40 including mold halves 42A and 42B (FIG. 6) having mold cavities 43A and 43B, respectively. Cavities 43A and 43B have shapes corresponding to the outer surfaces of screw boss insert 10. A pin 38 is positioned in a cavity formed by the cavity portions 43A and 43B when mold halves 42A and 42B are closed, and polymer material is then injected into the mold cavity such that the pin 38 forms an opening 35 in end surface 36 of screw boss insert 10. Examples of suitable thermoplastic polymer materials are polypropylene and ABS. However, the present disclosure is not limited to these materials, and insert 10 may comprise a wide range of materials such as thermosetting polymers or metals.

Lower portion 24 of screw boss insert 10 includes a cylindrical outer surface portion 44 having a transverse dimension (e.g., diameter) that is reduced relative to a transverse dimension (diameter) of cylindrical surface 33 of upper portion 22. A transverse surface 45 extends between cylindrical surface 33 of shoulder 32 and cylindrical surface 34. Transverse surface 45 may be substantially flat and substantially orthogonal to axis C of screw boss insert 10. Lower portion 24 may include a non-circular feature to prevent rotation of screw boss insert 10 when a screw engages opening 35. For example, a plurality of slots 46 having flat base surfaces 47. The flat base surfaces 47 are not symmetrical about the center line C to thereby prevent rotation of screw boss insert 10 when polymer material 18 of component 1 is molded around the screw boss insert 10. End surface 48 (FIG. 6) of screw boss insert 10 may be curved (e.g., hemispherical). As shown in FIG. 4, opening 35 is a blind hole, having a cylindrical (or slightly conical) inner surface 39 and a flat inside end surface 37. Surface 39 may be cylindrical or tapered such that surface 39 is a larger diameter adjacent opening 35 and a smaller diameter adjacent inner end surface 37. For example, surface 39A adjacent end surface 36 may be tapered (conical).

Figure 7:
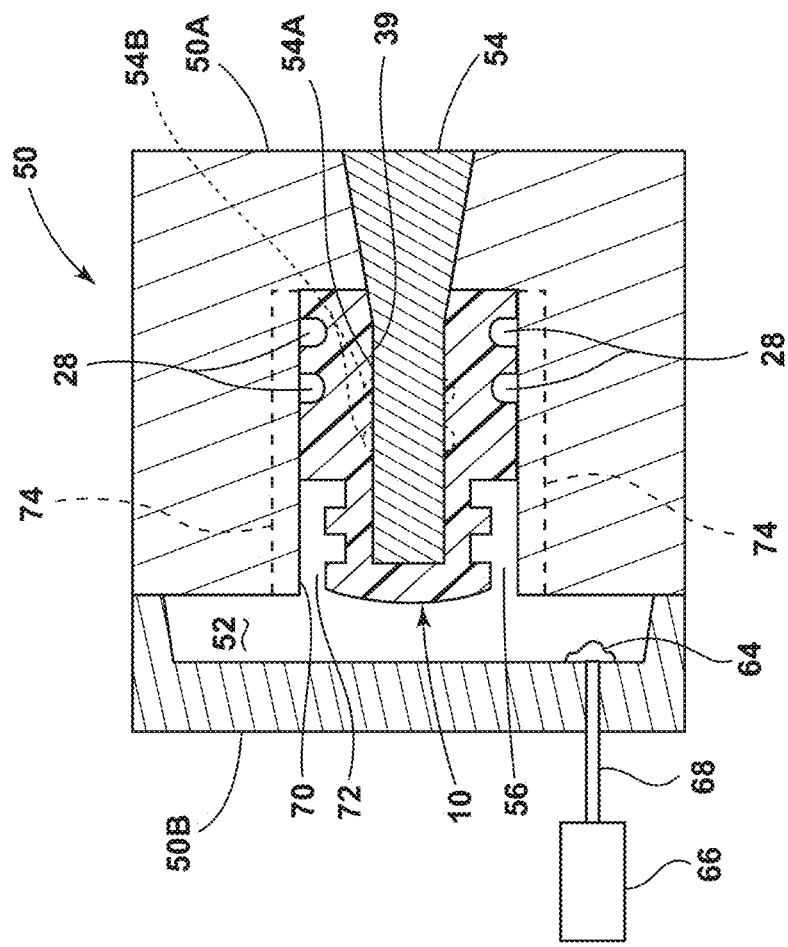
FIG. 7 is a schematic view showing a screw boss insert in an injection mold.
Figure 8:
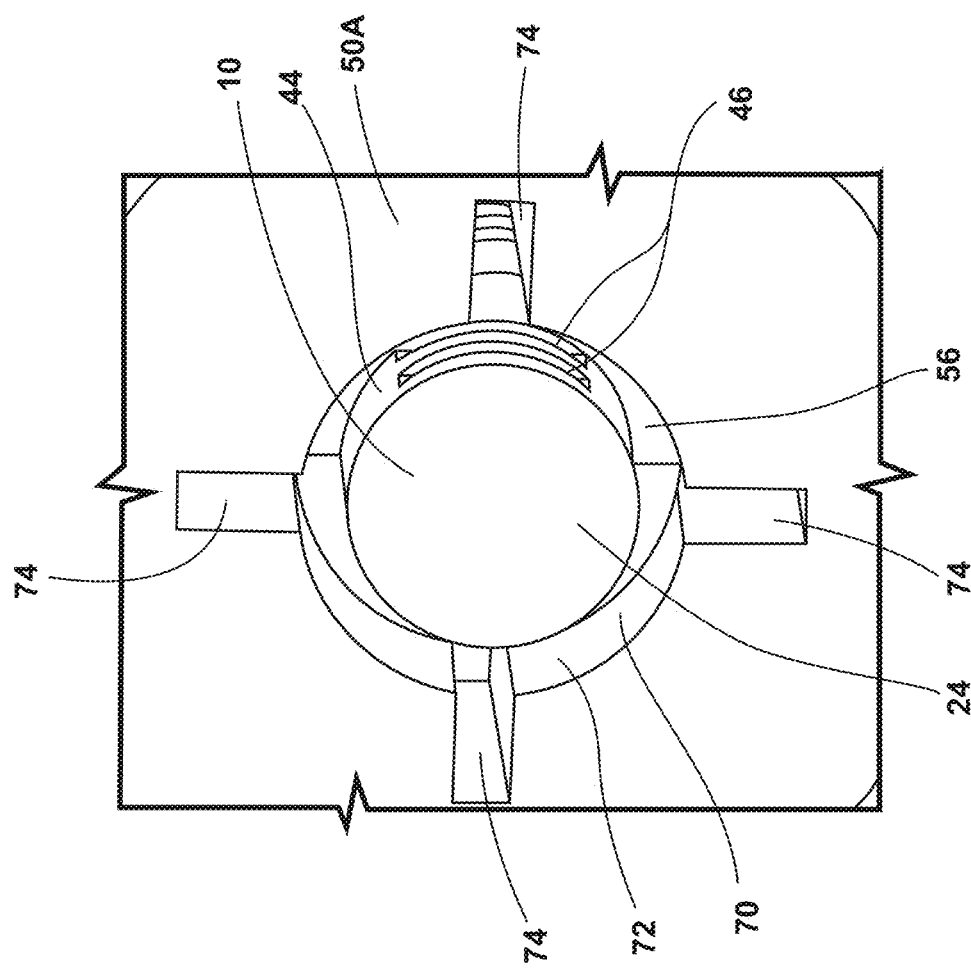
FIG. 8 is an isometric view of a screw boss insert positioned in a mold tool.
Figure 9:
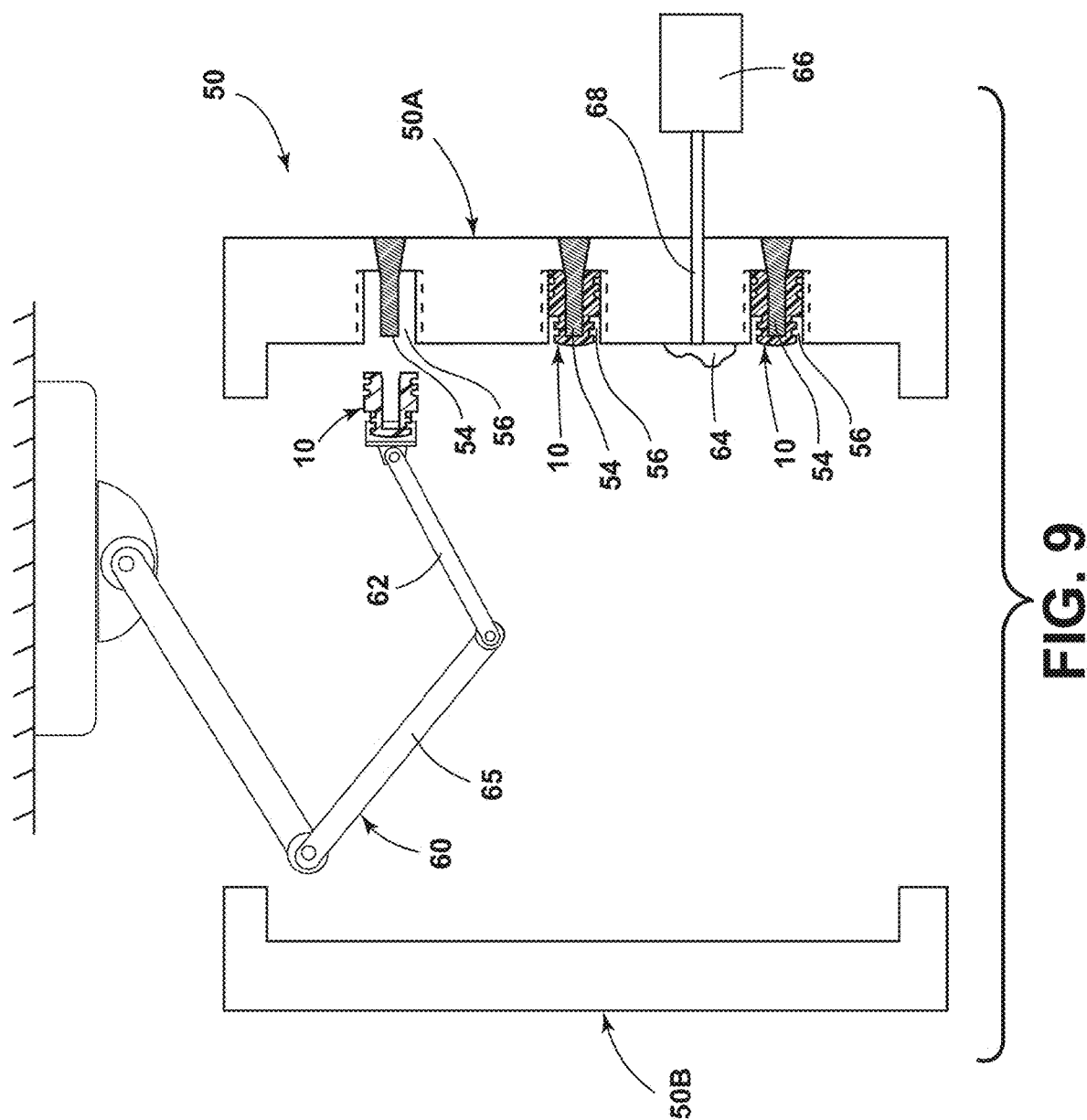
FIG. 9 is a schematic view showing a mold tool and robot configured to install the screw boss inserts in a mold tool.

With further reference to FIGS. 7-9, during fabrication of a component 1, a screw boss insert 10 is positioned on a pin 54 of a mold tool component 50A. Mold tool components 50A and 50B define a mold cavity 52 when closed as shown schematically in FIG. 7. The mold tool part 50A includes one or more boss cavities 56, and a pin 54 projecting into each boss cavity 56. Mold tool component 50B may optionally include one or more boss cavities 56 and pins 54.

During fabrication of a component 1, a robot 60 having a robot arm 65 may be utilized to position one or more screw boss inserts 10 on pins 54 in boss cavities 56 of mold component 50A prior to bringing the mold tool components 50A and 50B together to form mold cavity 52 having a shape corresponding to component 1. Pins 54 may have a transverse dimension (e.g., diameter) that is slightly larger (e.g., about 0.0005 inches—about 0.001 inch, or more) to provide a frictional and/or interference fit to ensure that inserts 10 do not become dislodged from pins 54 (e.g., if pins 54 project downwardly). Outer surfaces 54A of pins 54 may optionally include raised annular ridges 54B or other surface features that engage and/or deform surface 39 of hole 35 of inserts 10 to retain inserts 10 on pins 54. After the screw boss inserts 10 are positioned on the pins 54, the mold tool components 50A and 50B are brought together, and molten thermoplastic polymer material 64 is injected into the cavity 52 by an injection molding machine 66 through one or more passageways 68 in mold tool parts 50A and/or 50B. The mold tool components 50A and 50B are moved apart to an open position (FIG. 9) after the polymer material forming component 1 solidifies. It will be understood that the number, size, and location of the passageways 68 may be varied as required to properly fill the mold cavity 52.

With reference to FIGS. 7 and 8, boss cavity 56 of mold part 50A may include a cylindrical surface 70 extending around lower portion 24 of screw boss insert 10 to form an annular gap 72 that is filled with molten (or uncured) polymer material 64 during injection molding process. One or more passageways 74 in mold part 50A also receive molten polymer material 64 during the molding process. Specifically, during the injection molding process, molten polymer material 64 flows into gap 72, into passageways 74, and into the grooves 28 of screw boss insert 10 to thereby form rings 76 of polymer material. The molten polymer material in passageways 74 solidifies to form ribs 6 (FIGS. 2 and 3). Cylindrical mold surface 70 may fit tightly against surfaces 27 and 33 of screw boss insert 10 such that these surfaces are exposed in the final screw bosses 5, 5A (FIGS. 2 and 3). Sidewall 70 forms cylindrical polymer surfaces 78 in screw bosses 5, 5A.

During the injection molding process, molten (or uncured) polymer material also flows into the slots 46 of end 24 of screw boss insert 10. Due to flat surfaces 47, the slots 46 are not symmetrical about the center line C of the screw boss insert 10, and the slots 46 prevent rotation of screw boss insert 10 in component 1 when a screw 15 is threaded into the opening 35 of screw boss insert 10. If the screw boss 5 or 5A includes ribs 6 (e.g., FIGS. 2 and 3), the passageways 74 may extend substantially the full length of screw boss insert 10 as shown in FIGS. 2 and 3 to form ribs 6. However, during formation of a screw boss 5B without ribs (FIG. 4), a mold tool 50A that only includes an annular space 72 (without passageways 74) may be utilized to thereby cause molten polymer material 64 to form the surrounding polymer material 18 (FIG. 4). As discussed above, polymer material 18 has an outer surface 19 with substantially the same diameter as outer surface 21 of screw boss insert 10. In the screw boss 5B of FIG. 4, the molten polymer material flows into the slots 46 to thereby secure the screw boss insert 10 and prevent rotation of screw boss insert 10 when threaded fasteners are inserted into the opening 35 of screw boss insert 10.

Screw boss insert 10 may be made from a thermoplastic polymer material that is substantially identical to the polymer material of the component 1. The temperatures and pressures of the mold tool 50 may be set or adjusted to cause the molten polymer material of the component 1 to bond and fuse/intermix with the thermoplastic material of screw boss insert 10. This may partially melt the polymer material of screw boss insert 10 to provide a strong, integral bond between the screw boss insert 10 and the polymer material of the component 1. Alternatively, the screw boss insert 10 may be made of a different material (e.g., a thermoplastic polymer having a higher melting temperature, a thermosetting polymer, etc.) such that the material of screw boss insert 10 does not melt and intermix with the polymer material of the component 1. Nevertheless, the slots 46 and ribs 26 of screw boss insert 10 mechanically secure the screw boss insert 10 in the material of the component 1 during the injection molding process to thereby ensure that the screw boss insert 10 does not rotate or pull out when a screw 15 is threaded into the screw boss insert 10. Furthermore, the present disclosure is not limited to injection molding of thermoplastic polymers in mold tool 50. For example, thermosetting polymers or other suitable materials may also be utilized to make components having inserts 10 molded therein.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method of forming a screw boss in an injection molded polymer part, the method comprising:
    providing a polymer screw boss insert defining an axis and having first and second opposite ends, an outer surface extending between the first and second opposite ends, and a pin cavity having an opening at the first end;
    providing a mold tool having first and second mold tool parts that form a primary cavity when the first and second mold tool parts are in a closed position relative to one another, at least one of the first and second mold tool parts having a boss cavity portion and a pin projecting into the boss cavity portion, wherein the boss cavity portion defines inner guide surfaces and at least one channel between the guide surfaces;
    positioning the screw boss insert at least partially within the boss cavity portion with the pin received in the pin cavity of the screw boss insert with at least a first portion of the outer surface of the screw boss insert in contact with the inner guide surfaces and with at least a second portion of the outer surface of the screw boss insert spaced apart from the surface of the boss cavity portion at the channels to form side passageways extending along at least one channel;
    causing molten polymer material to flow into the primary cavity and into the side passageways along the outer surface of the screw boss insert while the screw boss insert is positioned on the pin;
    allowing the molten polymer material to solidify whereby the polymer material in the side passageways bonds to the screw boss insert and retains the screw boss insert to solidified polymer material in the primary cavity.

2. The method of claim 1, wherein:
    the screw boss insert includes a cylindrical outer surface portion;
    the inner guide surfaces are cylindrical; and including:
    causing the cylindrical outer surface of the screw boss insert to contact the cylindrical inner guide surfaces.

3. The method of claim 2, wherein:
    the outer surface of the screw boss insert includes a first outer surface portion adjacent the first end, a second outer surface portion adjacent the second end, and a transition surface between the first and second outer surface portions, and wherein the screw boss insert has at least one non-circular surface feature; and including:
    causing molten polymer material to flow into engagement with the non-circular surface feature whereby the polymer material prevents rotation of the screw boss insert when the polymer material solidifies.

4. The method of claim 3, wherein:
    the first outer surface portion includes an annular groove and cylindrical rib surfaces on opposite sides of the annular grove;
    the boss cavity portion includes a cylindrical surface that contacts the cylindrical rib surfaces and is spaced apart from a surface of the annular groove to form an annular passageway that connects to the side passageways; and including:
    causing molten polymer material to flow through the side passageways into the annular passageways.

5. The method of claim 4, wherein:
    the annular groove comprises at least two annular grooves with a first cylindrical rib surface between the at least two annular grooves and second and third cylindrical rib surfaces adjacent the at least two annular grooves opposite the first cylindrical rib surface, wherein the at least two annular grooves are connected to the side passageways; and including:
    causing molten polymer material to flow through the side passageways into the at least two annular grooves.

6. The method of claim 4, wherein:
    the second end of the screw boss insert has a cylindrical outer surface portion that has a smaller diameter than a diameter of the cylindrical rib surfaces, and the cylindrical outer surface portion is spaced apart from a surface of the boss cavity portion to form an annular gap when the screw boss insert is positioned in the secondary cavity on the pin; and including:
    causing molten polymer material to flow into the annular gap around the second end of the screw boss insert.

7. The method of claim 6, wherein:
    the second end has a second end surface and the pin cavity does not extend to the second end surface; and including:
    causing molten polymer material to cover the second end surface.

8. The method of claim 4, wherein:
    the side passageways extend across the cylindrical rib surfaces to form gaps; and including:
    causing molten polymer material to flow into the side passageways over the cylindrical rib surfaces to form reinforcing ribs upon solidification of the polymer material.

9. The method of claim 3, wherein:
    the second outer surface portion has an outer surface spaced inwardly from the first outer surface portion;
    the transition surface extends transversely between the first outer surface portion and the second outer surface portion;
    the boss cavity portion includes an annular mold surface extending around and engaging the first outer surface portion adjacent the transition surface to prevent flow of molten polymer material between the annular mold surface and the first outer surface portion of the screw boss insert, the secondary cavity further including a mold surface portion that is spaced apart from the second outer surface portion to form a gap therebetween; and including:
    causing molten polymer material to flow into the gap around the second outer surface portion.

10. The method of claim 9, wherein:
    the non-circular surface feature comprises at least one channel formed in the second outer surface portion, wherein the at least one channel has a base surface that is non-circular; and including:

causing molten polymer material to flow into the at least one channel formed in the second outer surface portion.

11. The method of claim 9, wherein:

the non-circular surface feature comprises at least a pair of substantially planar surfaces on opposite sides of the second outer surface portion.

12. The method of claim 1, wherein:

the pin cavity has a substantially cylindrical inner surface; and including:

after the molten polymer material has solidified, causing a self-tapping threaded screw to engage the inner surface to form threads in the inner surface and to interconnect the injection molded polymer part and a second part.

13. The method of claim 1, wherein:

the pin forms an interference fit when inserted into the pin cavity of the screw boss insert; and including:

utilizing a robot to position the screw boss insert on the pin in the boss cavity portion.

14. The method of claim 1, wherein:

the screw boss insert comprises a polymer body having first and second opposite ends and a first outer surface portion adjacent the first end, a second outer surface portion adjacent the second end, and a transition surface between the first and second outer surface portions;

wherein the first outer surface portion has a transverse dimension that is greater than a transverse dimension of the second outer surface portion, the transition surface extending between the first and second outer surface portions and facing the second opposite end;

wherein the first and second opposite ends have first and second end surfaces, respectively, and wherein the second outer surface portion includes a non-circular surface feature;

wherein the pin cavity comprises a blind pin cavity in the polymer body, the blind pin cavity having an opening in the first surface, the blind pin cavity having a generally cylindrical inner surface configured to receive a self-tapping threaded screw to form threads in the inner surface; and including:

causing molten polymer material to flow into engagement with the non-circular surface feature whereby the polymer material prevents rotation of the screw boss insert when the polymer material solidifies.

15. A method of forming a screw boss in an injection molded polymer component, the method comprising:

forming a polymer insert by injection molding thermoplastic polymer material into a first mold cavity;

wherein the polymer insert includes a plurality of grooves on an outer surface, and a screw-receiving opening;

positioning the polymer insert on a pin in a second mold cavity by inserting the pin into the screw-receiving opening;

causing molten thermoplastic polymer material to flow around the polymer insert and into the plurality of grooves on the outer surface of the polymer insert while the polymer insert is positioned on the pin in the second mold cavity; and followed by allowing the molten thermoplastic polymer material to solidify around the polymer insert while the polymer insert is positioned on the pin in the second mold cavity.

16. The method of claim 15, wherein:

the polymer insert includes a flat outer surface; and including:

causing molten polymer material to contact the flat outer surface.

17. The method of claim 14, wherein:

the screw boss insert comprises a one-piece continuous molded polymer part, and wherein the inner surface of the blind pin cavity comprises molded polymer; and including:

causing the pin to contact the inner surface of the blind pin cavity.

18. The method of claim 14, wherein:

the first outer surface portion includes at least one outwardly-opening annular groove and first and second cylindrical rib surfaces on opposite sides of the annular groove; and including:

causing molten polymer material to contact the at least one outwardly-opening annular groove.

19. The method of claim 14, wherein:

the non-circular surface feature comprises at least one channel having a substantially planar base surface; and including:

causing molten polymer material to contact the substantially planar base surface.

20. The method of claim 14, wherein:

the first and second outer surface portions include first and second cylindrical outer surfaces, and the transition surface comprises an annular step that is orthogonal to the first and second cylindrical outer surfaces; and including:

causing molten polymer material to contact the transition surface.

* * * * *